(12) United States Patent
Doehring et al.

(10) Patent No.: US 11,306,779 B2
(45) Date of Patent: Apr. 19, 2022

(54) METHOD FOR PRODUCING COMPONENTS OF A TILTING-PAD BEARING, AND TILTING-PAD BEARING

(71) Applicant: Robert Bosch GmbH, Stuttgart (DE)

(72) Inventors: Jochen Doehring, Stuttgart-Stammheim (DE); Andreas Vogt, Renningen (DE); Michael Mayer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 248 days.

(21) Appl. No.: 16/627,401

(22) PCT Filed: Jun. 13, 2018

(86) PCT No.: PCT/EP2018/065641
§ 371 (c)(1),
(2) Date: Dec. 30, 2019

(87) PCT Pub. No.: WO2019/001965
PCT Pub. Date: Jan. 3, 2019

(65) Prior Publication Data
US 2021/0088077 A1   Mar. 25, 2021

(30) Foreign Application Priority Data
Jun. 29, 2017   (DE) ............ 10 2017 211 046.5

(51) Int. Cl.
*F16C 33/14*   (2006.01)
*F16C 17/03*   (2006.01)

(52) U.S. Cl.
CPC .............. *F16C 33/14* (2013.01); *F16C 17/03* (2013.01)

(58) Field of Classification Search
CPC .................................. F16C 17/03; F16C 17/26
See application file for complete search history.

(56) References Cited

U.S. PATENT DOCUMENTS 3,804,472 A * 4/1974 Schuller ................. F16C 17/03
 384/302
3,807,814 A   4/1974 Stopp
(Continued)

FOREIGN PATENT DOCUMENTS

CN   101625011 A   1/2010
CN   201916362 U   8/2011
(Continued)

OTHER PUBLICATIONS

International Search Report for Application No. PCT/EP2018/065641 dated Sep. 6, 2018 (English Translation, 2 pages).

*Primary Examiner* — Jacob J Cigna
(74) *Attorney, Agent, or Firm* — Michael Best & Friedrich LLP

(57) ABSTRACT

The invention relates to a method for producing components of a tilting-pad bearing (10; 10a), wherein: the tilting-pad bearing (10; 10a) has an outer ring (12; 12a) and multiple tilting pads (18; 18a) preferably arranged at regular angular intervals about a longitudinal axis (3; 46) of the outer ring (12; 12a); the tilting pads (18; 8a) are pivotably mounted with an outer surface (20; 20a) about a pitch line (26; 26a) on an inner surface (16; 16a) of the outer ring (12; 12a); and a blank (30; 30a) in the form a cylinder portion (14) having a constant wall thickness is used to produce the tilting pads (18) from a tilting pad ring (42) or to produce the outer ring (12a). The invention is characterised in that: a radial force ($F_R$) acting in the direction of the longitudinal axis (3; 46) is applied to the cylinder portion (14) at multiple clamping points (33; 33a, 34; 34a, 35; 35a) in the region of its outer periphery (32; 32a), said radial forces ($F_R$) elastically deforming the cylinder portion (14); an inner bore (38; 38a) having a round cross-section is subsequently produced on the inner surface (16; 16a) of the elastically deformed (Continued)

cylinder portion (14); and subsequently the radial clamping of the cylinder portion (14) is stopped.

8 Claims, 3 Drawing Sheets

(56) References Cited

U.S. PATENT DOCUMENTS

| | | | | |
|---|---|---|---|---|
| 3,830,552 | A * | 8/1974 | Schuller | F16C 17/035 |
| | | | | 384/286 |
| 4,580,911 | A * | 4/1986 | Burkhard | F16C 17/03 |
| | | | | 384/309 |
| 5,634,725 | A * | 6/1997 | Chester | F16C 17/03 |
| | | | | 384/117 |
| 6,099,271 | A * | 8/2000 | Brookbank | F16C 33/1075 |
| | | | | 384/312 |
| 7,566,174 | B2 * | 7/2009 | Kurimura | F16C 33/1085 |
| | | | | 384/114 |
| 8,726,503 | B2 | 5/2014 | Pettinato et al. | |
| 9,605,712 | B2 * | 3/2017 | Olausson | F16C 17/03 |
| 9,726,189 | B2 * | 8/2017 | Nishida | F01D 25/186 |
| 10,330,152 | B2 * | 6/2019 | Futae | F02B 33/40 |
| 2006/0078239 | A1 * | 4/2006 | Dimofte | F16C 17/028 |
| | | | | 384/100 |
| 2007/0230843 | A1 * | 10/2007 | Kurimura | F16C 33/103 |
| | | | | 384/130 |
| 2008/0267543 | A1 | 10/2008 | Wade et al. | |
| 2014/0010647 | A1 * | 1/2014 | Nishida | F16C 17/26 |
| | | | | 415/229 |
| 2015/0330442 | A1 | 11/2015 | Futae et al. | |
| 2018/0003220 | A1 * | 1/2018 | Arihara | F16C 33/1045 |

FOREIGN PATENT DOCUMENTS

| | | | | |
|---|---|---|---|---|
| DE | 3528121 A1 | * | 2/1987 | F16C 17/028 |
| DE | 102007008142 A1 | | 3/2008 | |
| DE | 102007026882 A1 | | 12/2008 | |
| EP | 2693017 | | 2/2014 | |
| JP | S57195914 A | | 12/1982 | |
| JP | S6060320 A | | 4/1985 | |
| JP | 2002239815 A | | 8/2002 | |
| KR | 20190114087 A | * | 10/2019 | |
| WO | WO-2015130490 A1 | * | 9/2015 | B22D 19/12 |

* cited by examiner

METHOD FOR PRODUCING COMPONENTS OF A TILTING-PAD BEARING, AND TILTING-PAD BEARING

BACKGROUND OF THE INVENTION

The invention relates to a method for producing components of a tilting-pad bearing, as well as to a tilting-pad bearing.

Tilting-pad bearings for mounting in particular fast-rotating shafts (this herein referring to shafts which rotate at a rotating speed of more than 100,000 min$^{-1}$, for example) can be assigned to two fundamental construction types. In the case of the first construction type, the tilting-pad bearing which is composed of an outer race and of tilting pads which for mounting the shaft are disposed radially within the outer race is configured from a monolithic (blank) body in which the tilting pads are exposed or configured, respectively, from the body by recesses or the like, and are connected (integrally) to the outer race so as to be tiltable by in particular web-shaped connections. The second construction type is composed of an outer race as well as of tilting pads which are in each case manufactured in a mutually separate manner. In the case of the second construction type, the tilting pads are likewise disposed so as to be radially within the outer race and are distinguished in that said tilting pads on that side that radially faces the outer race are more heavily curved than the corresponding internal face of the outer race that interacts with the tilting pads. On account thereof, it is possible for the tilting pads to roll about rolling lines on the outer race. Further, the raceway of the tilting pad that interacts with the shaft is less heavily curved that the radius of the shaft to be mounted. In summary, it is thus essential in the case of the second construction type that the tilting pad on that side thereof that faces the shaft or the outer race, respectively, has curvatures or radii, respectively, that are adapted to the (internal) contour of the outer race or to the radius of the shaft, respectively. The production in practical terms of geometries of the tilting pads, or of the outer race, respectively, that are adapted in such a manner is achieved by contour grinding. However, this is relatively complex, or associated with relatively high costs, respectively.

SUMMARY OF THE INVENTION

The method according to the invention for producing components of a tilting-pad bearing, this herein referring to either the outer race or else the tilting pads of the tilting-pad bearing, has the advantage that said method enables a relatively simple and thus cost-effective production of the components. This is made possible in that the contour grinding that is usually used in the prior art in order for the special geometries to be configured on the tilting pads, or on the geometry on the outer race that interacts with the tilting pads, respectively, can be dispensed with, and relevant geometries can instead be generated by a simple boring process and grinding process, respectively, in which only round contours or surfaces, respectively, have to be generated.

The invention is based on the concept of clamping a blank that serves for the production or generation, respectively, of an outer race or of the tilting pads, prior to shaping or machining, respectively, at a plurality of locations on the external circumference in such a manner that radial forces acting on the (annular) blank are generated at the clamping locations, said radial forces causing an elastic deformation of the blank. A circular bore or contour, respectively, is subsequently generated in the elastically deformed state of the blank. The radial clamping of the blank is subsequently cancelled which causes the blank to reassume the original round contour thereof on the external circumference of said blank, while the (internal) contour which initially was generated so as to be circular assumes a fresh contour which deviates from the original (circular) contour. A blank produced or machined, respectively, in this manner enables said blank to be used either as the outer race for the tilting-pad bearing, or else enables a plurality of tilting pads to be generated from the blank by radially separating the blank, said tilting pads being able to serve for use or disposal, respectively, in an outer race of the tilting-pad bearing. Depending on whether an outer race or else tilting pads are generated from the blank, the method according to the invention enables in particular that parts which can have simple round raceways or geometries, respectively, can be used as complementary components for the tilting pads or the outer race, respectively. These herein conceivably are preferably components which are composed of cylindrical blanks which in turn represent standard components which are available at low cost with the most varied geometries or diameters, respectively.

The method according to the invention specifically proposes that a blank in the form of a cylindrical portion having a consistent wall thickness is used for producing tilting pads from a tilting-pad race or an outer race; that the cylindrical portion in the region of the external circumference thereof at a plurality of locations is in each case impinged with a radial force acting in the direction of the longitudinal axis of the blank, wherein the radial forces cause an elastic deformation of the cylindrical portion; that an internal bore having a round cross section is subsequently generated on an internal face on the cylindrical portion in the elastically deformed state; and that the radial clamping of the cylindrical portion is subsequently cancelled.

In the case of the blank being used as an outer race for a tilting-pad bearing it is provided that the number of locations at which the blank is impinged with the radial forces corresponds to the number of the tilting pads mounted in the outer race.

In the case of the blank serving for the configuration of tilting pads it is furthermore provided that the number of locations at which the blank is impinged with the radial forces corresponds to the number of the tilting pads which are configured from the blank by radially separating the blank. On account thereof, it is possible for the entire blank to be utilized for the configuration of tilting pads.

In order for a symmetrical disposal or configuration, respectively, of the components of the tilting-pad bearing in relation to the mounted shaft to be enabled, it is moreover provided that the locations at which the blank is force-impinged with the radial forces are disposed at uniform angular spacings about a longitudinal axis of the cylindrical blank.

In order for thermal expansions which in the operation or use, respectively, of the tilting-pad bearing are caused by a rotation of the shaft in the tilting pads and by the friction heat resulting therefrom to be compensated, or in order for jamming between the tilting pads and the shaft to be avoided in a state of the outer race installed in a bore, respectively, in the case of the blank being used as the outer race of the tilting-pad bearing it is moreover provided that the wall thickness of the blank is reduced in the region of the rolling lines in which the tilting pads are disposed so as to contact the outer race. A reduction of this manner in the wall thickness of the outer race, or the blank, respectively, is generated in a particular simple manner by configuring oblate areas on the external circumference of the blank.

The invention also comprises a tilting-pad bearing having an outer race and tilting pads, wherein the outer race or the tilting pads is/are produced by a method according to the invention as described to this extent.

In the case of the outer race being produced by a method according to the invention, it is particularly preferably provided that the tilting pads have a consistent wall thickness. In this case, cylindrical tubular portions having a consistent internal diameter and external diameter can be used for the tilting pads, said cylindrical tubular portions being producible or available, respectively, at a relatively low cost and for production-related reasons being of high precision. By contrast, in the case of the tilting pads being produced by a method according to the invention, it is provided that a cylindrical portion having a consistent internal diameter and external diameter is used as the outer race. In this case, the outer race is producible in a particularly cost-effective or simple manner, respectively, and is of high precision.

BRIEF DESCRIPTION OF THE DRAWINGS

Further advantages, features, and details of the invention are derived from the description hereunder of preferred exemplary embodiments as well as by means of the drawing in which.

Identical elements, or elements of equivalent function, are provided with the same reference signs in the figures.

DETAILED DESCRIPTION

Figure 1:
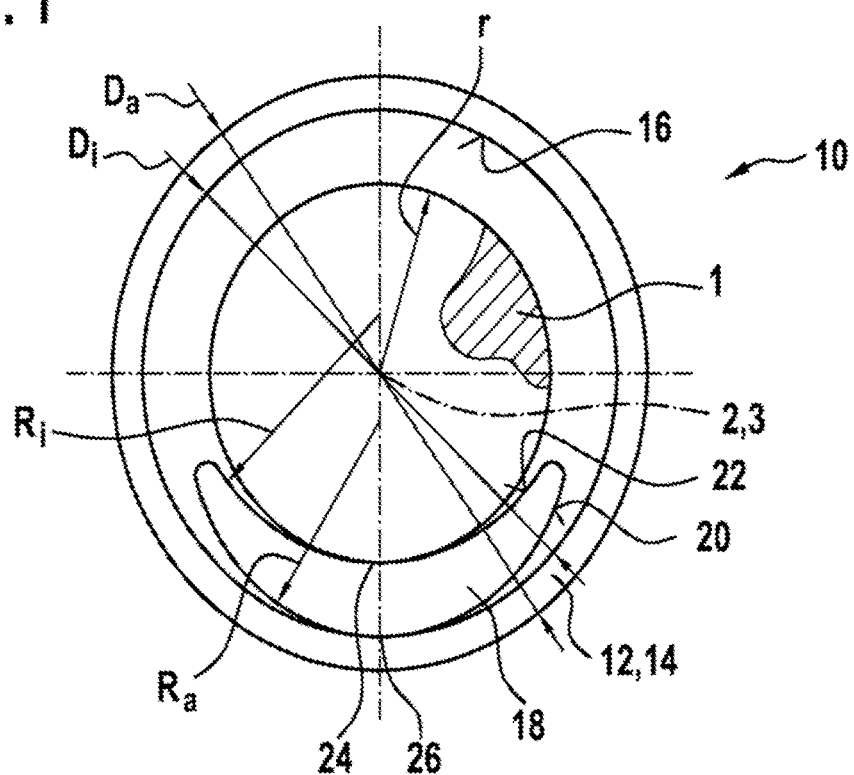
FIG. 1 shows a tilting-pad bearing for mounting a shaft in a simplified illustration.

A tilting-pad bearing 10 for radially mounting a shaft 1 is illustrated in FIG. 1, wherein the shaft 1 in the tilting-pad bearing 10 is rotatable about a rotation axis 2. The shaft 1 is preferably a component part of a fast-running machine, but is not limited thereto, wherein the circumferential speed of the shaft 1 in the region of the tilting-pad bearing 10, or of the mounting, respectively, in an exemplary but also not limiting manner can be more than 100 m/s, or else the rotating speed of the shaft 1 can be more than 100,000 min$^{-1}$.

The tilting-pad bearing 10 has an outer race 12 that in an exemplary manner is configured from steel, wherein the outer race 12 is preferably configured by cutting-to-length a standard tube having standard dimensions, or similar, and extends perpendicularly to the drawing plane of FIG. 1. The outer race 12 is in particular a cylindrical portion 14 having a longitudinal axis 3 which in the installed state of the shaft 1 is aligned with the rotation axis 2 of the shaft 1.

The outer race 12, when viewed in the circumferential direction, has a consistent internal diameter $D_i$ as well as a consistent external diameter $D_a$.

An internal face 16 of the outer race 12 configures a bearing region for tilting pads 18 which in the exemplary embodiment are in the shape of sickles. For reasons of improved clarity, only a single tilting pad 18 is illustrated in the illustration of FIG. 1. However, a plurality of tilting pads 18 of this type, for example three or four tilting pads 18 of identical configuration are usually used in tilting-pad bearings 10 of this type, said tilting pads 18 when viewed in the circumferential direction of the outer race 12 preferably being disposed at uniform angular spacings about the longitudinal axis 3.

The tilting pad 18 that in an exemplary manner is likewise composed of steel, proceeding from the longitudinal axis 3, on that side that faces the internal face 16 has an external face 20 having a radius $R_a$, wherein the radius $R_a$ is smaller than $D_a$. Furthermore, the tilting pad 18 on that side that faces the shaft 1 has a raceway 22 which is configured as a round raceway 22 having a radius $R_i$. It can also be seen by means of FIG. 1 that the radius r of the shaft 1 is smaller than the radius $R_i$ of the raceway 22.

By virtue of the geometries described, the shaft 1 in a direction running perpendicularly to the drawing plane of FIG. 1 bears along a line 24 on the tilting pad 18, while the tilting pad 18 in turn bears along a rolling line 26 on the internal face 16 of the outer race 12, and wherein the tilting pad 18 is tiltable about the rolling line 26.

Both the outer race 12 as well as the tilting pads 18 of the tilting-pad bearing 10 represent components of the tilting-pad bearing 10. The production of tilting pads 18 from an annular blank 30 is first discussed hereunder. To this end, reference is first made to FIG. 2 in which the blank 30 is illustrated, said blank 30 on the external circumference 32 thereof in the region of three clamping locations 33 to 35 which are disposed at uniform angular spacings about a longitudinal axis 37 of the blank 30 being clamped in a clamping installation (not illustrated). On account thereof, forces $F_R$ acting radially in the direction of the longitudinal axis 37 act in the region of the clamping locations 33 to 35, said forces $F_R$ causing an elastic deformation of the blank 30 in that the regions of the blank 30 that are disposed between the clamping locations 33 to 35 are deformed in a radially outward manner in relation to the longitudinal axis 37. In this state of the blank 30, a (circular) internal bore 38 is generated in the blank 30. In order for the desired dimensional tolerance to be generated, the internal bore 38 is preferably ground.

Figure 3:
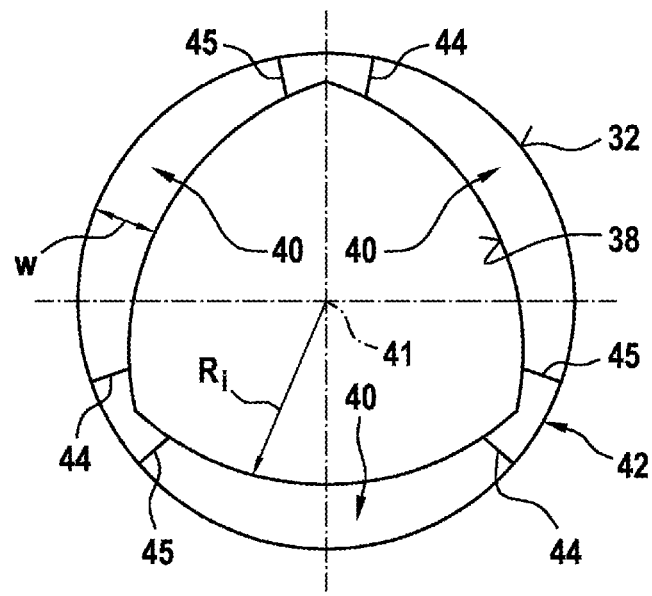
FIG. 3 shows the blank according to FIG. 2 after the reduction of the radial forces.

After the internal bore 38 has been configured, the blank 30 in a manner corresponding to the illustration of FIG. 3 is retrieved from the clamping tool (not illustrated), that is to say that no radial forces $F_R$ subsequently act on the blank 30 at the clamping locations 33 to 35. As a result, the external circumference 32 of the blank 30 reassumes the original round shape thereof, and the region in which the internal bore 38 has been configured simultaneously now has three portions 40 which are configured in an arcuate manner, the wall thickness w of said portions 40 varying in the circumferential direction, and which have in each case the radius $R_i$ in relation to a longitudinal axis 41 of the blank 30. The blank 30 in this state configures a tilting-pad race 42 from which in an exemplary manner three tilting pads 18 can be generated by way of radial separation in the region of separation locations 44, 45.

Figure 4:
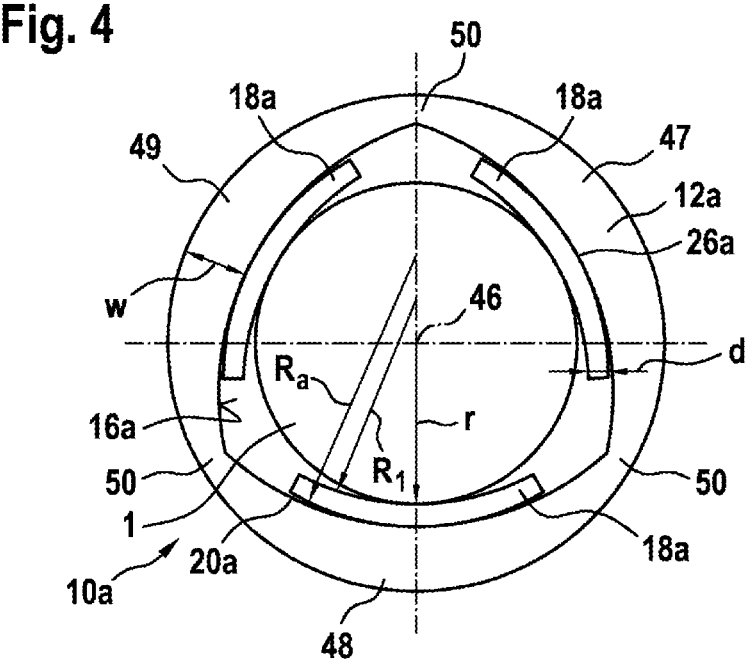
FIG. 4 shows a tilting-pad bearing for mounting a shaft in a simplified illustration, said tilting-pad bearing being modified in relation to that of FIG. 1.

A further tilting-pad bearing 10a is illustrated in FIG. 4, said further tilting-pad bearing 10a differing from the tilting-pad bearing 10 in that the tilting pads 18a for configuring external faces 20a have in each case a consistent thickness d as well as a consistent internal radius $R_i$ and a consistent external radius $R_a$. Furthermore, the outer race 12a has a circular external circumference in a manner analogous to the outer race 12. By contrast thereto, the internal face 16a of the outer race 12a has three portions 47 to 49 which have in each case a radius R and which when viewed in the circumferential direction, while configuring kinks on the internal side, adjoin one another at three transition locations 50. The wall thickness w of the outer race 12a varies along the portions 47 to 49.

Figure 6:
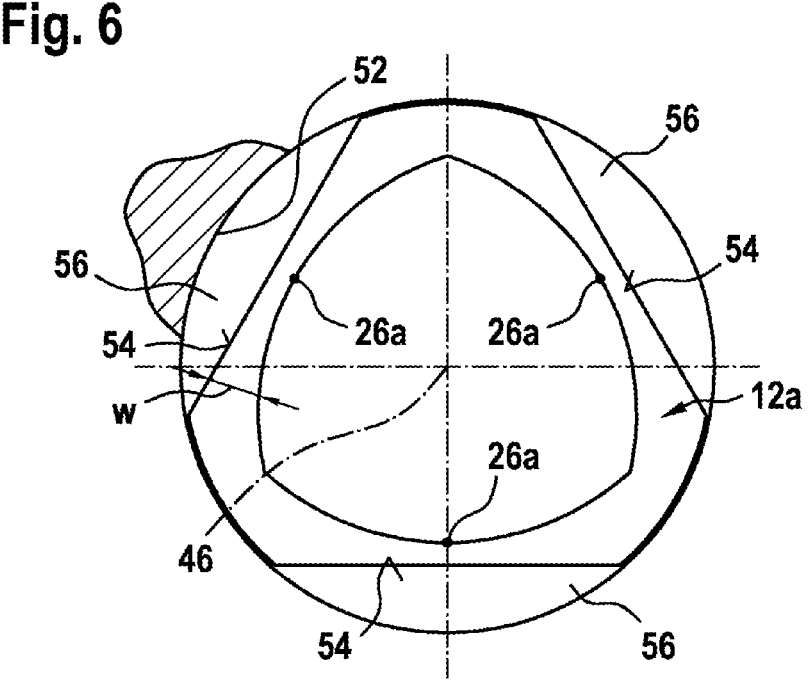
FIG. 6 shows an outer race inserted in the region of a circular receptacle bore.

It can furthermore be seen by means of FIG. 6 that an outer race 12a of this type is inserted in the region of a circular receptacle bore 52, or is disposed therein while configuring a press-fit, respectively, and that three oblate areas 54 that are disposed at uniform angular spacings about a longitudinal axis 46 are provided between the receptacle bore 52 and the external face 20a of the outer race 12a, the wall thickness w of the outer race 12a being reduced in the region of said oblate areas 54, wherein a minimum of the wall thickness w is present in the region of the rolling lines 26a. On account thereof, a gap 56 for equalizing thermal deformations of the outer race 12a is in each case configured between the oblate areas 54 and the receptacle bore 52.

Figure 2:
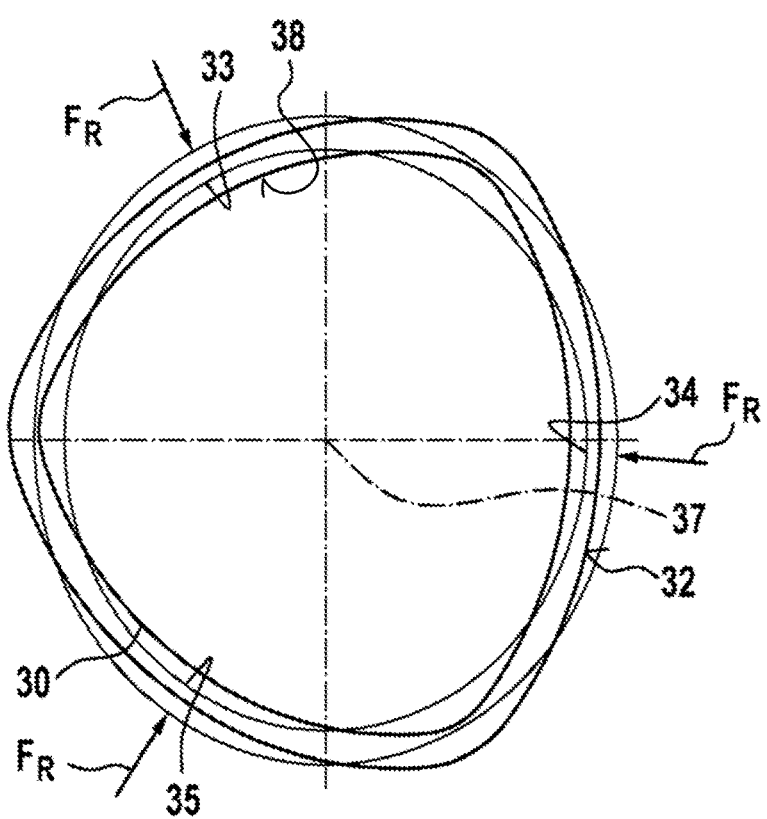
FIG. 2 shows an illustration of a blank serving for the production of tilting pads for the tilting-pad bearing according to FIG. 1, when impinged with a radial force.
Figure 5:
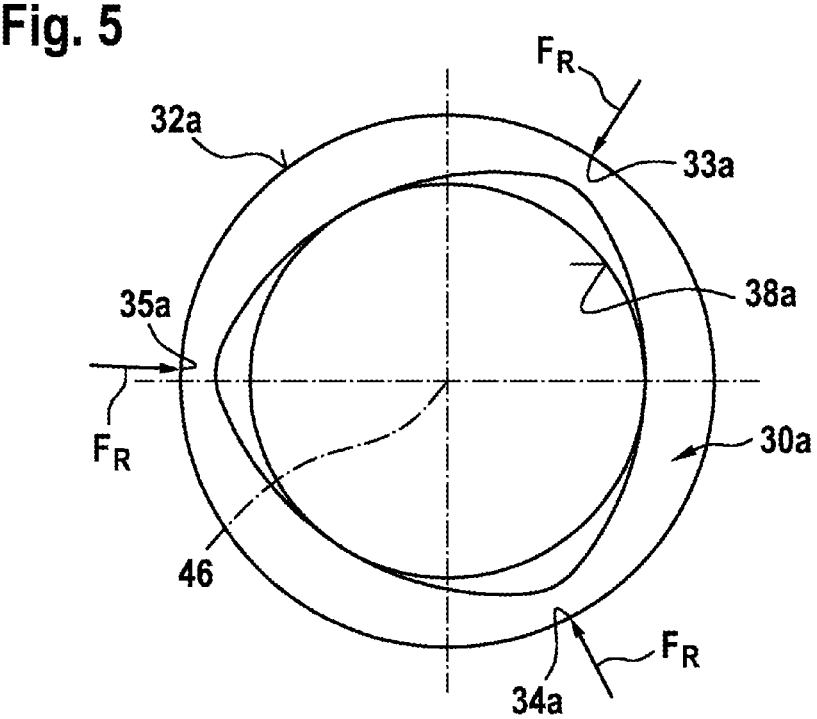
FIG. 5 shows a blank which is used for an outer race of the tilting-pad bearing according to FIG. 4, after the reduction of radial forces.

The production of the outer race 12a described to this extent corresponds at least substantially to the configuration of the tilting-pad race 42 described in the context of FIGS. 2 and 3 for configuring the tilting pads 18 in the case of the tilting-pad bearing 10. This means that here too an annular blank 30a in the region of three clamping locations 33a to 35a is clamped and elastically deformed by forces $F_R$ in a manner analogous to the illustration of FIG. 5. An internal bore 38a is subsequently generated, and the clamping of the blank 30a is released. The oblate areas 54 are optionally subsequently produced.

The tilting-pad bearing 10, 10a described to this extent can be varied or modified, respectively, in multiple ways without departing from the concept of the invention.

What is claimed is:

1. A method for producing components of a tilting-pad bearing (10; 10a), wherein the tilting-pad bearing (10; 10a) has an outer race (12; 12a) and a plurality of tilting pads (18; 18a), the method comprising:
    wherein the tilting pads (18; 18a) by way of an external face (20; 20a) are disposed so as to be pivotable about a rolling line (26; 26a) on an internal face (16; 16a) of the outer race (12; 12a);
    wherein a blank (30; 30a) in the form of a cylindrical portion (14) having a consistent wall thickness is used for producing the tilting pads (18) from a tilting-pad race (42);
    wherein the cylindrical portion (14) in the region of the external circumference (32; 32a) thereof at a plurality of clamping locations (33; 33a, 34; 34a, 35; 35a) is in each case impinged with a radial force (FR) acting in the direction of the longitudinal axis (3; 46);
    wherein the radial forces (FR) cause an elastic deformation of the cylindrical portion (14);
    wherein an internal bore (38; 38a) having a round cross section is subsequently generated on the internal face (16; 16a) on the cylindrical portion (14) in the elastically deformed state; and
    wherein the radial clamping of the cylindrical portion (14) is subsequently cancelled.

2. The method as claimed in claim 1, characterized in that the number of the clamping locations (33, 34, 35) at which the blank (30) is impinged with the radial forces ($F_R$) corresponds to the number of tilting pads (18) which are configured from the blank (30) by radially separating the blank (30) in the region of separation locations (44, 45).

3. The method as claimed in claim 1, characterized in that the clamping locations (33; 33a, 34; 34a, 35; 35a) at which the blank (30; 30a) is force-impinged with the radial forces ($F_R$) are disposed at uniform angular spacings about a longitudinal axis (37) of the blank (30; 30a).

4. A method for producing a tilting-pad bearing (10; 10a) having an outer race (12a) and tilting pads (18), wherein the tilting pads (18) are produced by the method for
    producing components of the tilting-pad bearing (10; 10a) as claimed in claim 1.

5. The method as claimed in claim 4, characterized in that the tilting pads (18) are configured from a cylindrical tubular portion having a consistent internal diameter (Di) and external diameter (Da).

6. The method as claimed in claim 4, wherein the outer race (12) is configured as a cylindrical portion (14) having a consistent internal diameter ($D_i$) and external diameter ($D_a$).

7. The method as claimed in claim 4, wherein the tilting pads (18; 18a) are disposed at equal angular spacings about a longitudinal axis (3; 46) of the outer race (12; 12a).

8. A method for producing a tilting-pad bearing (10; 10a) having an outer race (12; 12a) and a plurality of tilting pads (18; 18a), the method comprising:
    wherein the tilting pads (18; 18a) by way of an external face (20; 20a) are disposed so as to be pivotable about a rolling line (26; 26a) on an internal face (16; 16a) of the outer race (12; 12a);
    wherein a first blank (30; 30a) in the form of a cylindrical portion (14) having a consistent wall thickness is used for producing the tilting pads (18) from a tilting-pad race (42) and a second blank (30; 30a) in the form of a cylindrical portion (14) having a consistent wall thickness is used for producing the outer race (12a);
    wherein, for each of the first and second blanks:
    the cylindrical portion (14) in the region of the external circumference (32; 32a) thereof at a plurality of clamping locations (33; 33a, 34; 34a, 35; 35a) is in each case impinged with a radial force (FR) acting in the direction of the longitudinal axis (3; 46);
    the radial forces (FR) cause an elastic deformation of the cylindrical portion (14);
    an internal bore (38, 38a) having a round cross section is subsequently generated on the internal face (16; 16a) on the cylindrical portion (14) in the elastically deformed state; and
    the radial clamping of the cylindrical portion (14) is subsequently cancelled; and
    wherein the outer race (12; 12a) and the plurality of tilting pads (18; 18a) are assembled into the tilting-pad bearing (10; 10a).

* * * * *